(12) United States Patent
Boch et al.

(10) Patent No.: US 11,913,920 B2
(45) Date of Patent: Feb. 27, 2024

(54) METHOD AND SYSTEM FOR CONTROLLING PREPARATIVE LIQUID CHROMATOGRAPHY

(71) Applicant: INTERCHIM S.A., Montlucon (FR)

(72) Inventors: Lionel Boch, Desertines (FR); Didier Charbonneau, Montlucon (FR); Alain Tchapla, Les Ulis (FR); Dominique Desquaires, Lignerolles (FR); Olivier Mercier, Montlucon (FR); Yann Pourcheresse, Saint Pourcain sur Sioule (FR); Nicolas Quetant, Durdat Larequille (FR)

(73) Assignee: INTRCHIM S.A., Montlucon (FR)

( * ) Notice: Subject to any disclaimer, the term of this patent is extended or adjusted under 35 U.S.C. 154(b) by 742 days.

(21) Appl. No.: 17/045,549

(22) PCT Filed: Apr. 8, 2019

(86) PCT No.: PCT/FR2019/050823
§ 371 (c)(1),
(2) Date: Oct. 6, 2020

(87) PCT Pub. No.: WO2019/193300
PCT Pub. Date: Oct. 10, 2019

(65) Prior Publication Data
US 2021/0164948 A1     Jun. 3, 2021

(30) Foreign Application Priority Data
Apr. 6, 2018 (FR) ...................................... 1853044

(51) Int. Cl.
*G01N 30/86* (2006.01)
*B01D 15/16* (2006.01)
(Continued)

(52) U.S. Cl.
CPC ....... *G01N 30/8658* (2013.01); *B01D 15/165* (2013.01); *B01D 15/305* (2013.01);
(Continued)

(58) Field of Classification Search
CPC .......... G01N 30/8658; G01N 30/8672; G01N 30/90; G01N 2030/027; G01N 30/8679;
(Continued)

(56) References Cited

U.S. PATENT DOCUMENTS

| 6,413,431 | B1 * | 7/2002 | Abedi .................... | G01N 30/90 210/659 |
| 7,686,959 | B2 * | 3/2010 | Horsman ............... | G01N 30/34 210/143 |

(Continued)

FOREIGN PATENT DOCUMENTS

JP     2017125686 A     7/2017

OTHER PUBLICATIONS

Heron Sylvie, et al. "A New Methodology to Determine the Isoeluotropic Conditions on Ultra-performance Flash Purification Stationary Phases from Analytical Reversed Liquid Chromatography Stationary Phase", Journal of Chromatography A, Elsevier, Amsteram, NL. vol. 1397, Apr. 11, 2015, pp. 59-72.
(Continued)

*Primary Examiner* — Mohammad K Islam
(74) *Attorney, Agent, or Firm* — Thomas | Horstemeyer, LLP

(57) ABSTRACT

The invention relates to a method for controlling preparative liquid chromatography, comprising the following steps, at least a part of said steps being implemented by a computer comprising a processor and a display screen coupled to said processor:
(a) selecting an analytical liquid chromatography method from among thin layer chromatography (TLC) and high performance liquid chromatography (HPLC),
(Continued)

(b) inputting analytical liquid chromatography data obtained by the method selected at step (a) for a product to be purified,
(c) accessing a table of separating tools available to the user to implement said preparative liquid chromatography,
(d) from said analytical liquid chromatography data and table of available separating tools, selecting an optimal separating tool from said table and computing preparative liquid chromatography operating conditions for said selected separating tool.

24 Claims, 2 Drawing Sheets

(51) Int. Cl.
   *B01D 15/30*  (2006.01)
   *B01D 15/32*  (2006.01)
   *G01N 30/90*  (2006.01)
   *G01N 30/02*  (2006.01)

(52) U.S. Cl.
   CPC ......... *B01D 15/322* (2013.01); *B01D 15/327* (2013.01); *G01N 30/8672* (2013.01); *G01N 30/90* (2013.01); *G01N 2030/027* (2013.01)

(58) Field of Classification Search
   CPC .. B01D 15/165; B01D 15/305; B01D 15/322; B01D 15/327
   See application file for complete search history.

(56) References Cited

U.S. PATENT DOCUMENTS

| | | | |
|---|---|---|---|
| 2005/0247625 A1* | 11/2005 | Liu | B01D 15/166 210/101 |
| 2013/0146542 A1* | 6/2013 | Huang | B01J 20/3236 210/656 |
| 2017/0199165 A1 | 7/2017 | Okura | |

OTHER PUBLICATIONS

Fair, J.D., et al., "Flash Column Chromatograms Esetimated from Thin-Layer Chromotography Data", Journal of Chromatography A., Elsevier, Amsterdam, NL, vol. 1211, No. 1-2, Nov. 21, 2008, pp. 49-54.
Preliminary Search in co-pending related French Application No. FR 1853044, dated Mar. 6, 2019.
International Search Report in co-pending, related PCT application No. PCT/FR2019/050823, dated Dec. 7, 2019.

* cited by examiner

METHOD AND SYSTEM FOR CONTROLLING PREPARATIVE LIQUID CHROMATOGRAPHY

CROSS REFERENCE TO RELATED APPLICATIONS

This application is the 35 U.S.C. § 371 national stage application of PCT Application No. PCT/FR2019/050823, filed Apr. 8, 2019, which application claims the benefit of French Application No. FR 1853044, filed Apr. 6, 2018, both of which are hereby incorporated by reference herein in their entireties, including any figures, tables, nucleic acid sequence, amino acid sequences, or drawings.

FIELD OF THE INVENTION

The present invention relates to a method and a system for controlling preparative liquid chromatography, from low pressure to high pressure.

PRIOR ART

Preparative liquid chromatography is a method for isolating, purifying or enriching a mixture of compounds which, to be optimal, necessitates the selection of a certain number of parameters as regards the separating tool used (inner diameter, length, stationary phase, particle size, etc.) and the operating conditions (mobile phase, type of elution, flow rate, temperature, injection mode, amount injected, etc.). The choice of these parameters often comes down to a productivity compromise between the desired level of purity, the amount of pure product desired, the cost and the duration of the purification method.

To make this choice, it is known to use the separation results obtained, for a sample of same nature, with an analytical chromatographic system and to transpose it to preparative liquid chromatography. The term "scale-up" thus defines a multiplier coefficient between the amount of sample treated in analytical liquid chromatography and the amount of sample treated in preparative liquid chromatography.

However, the analytical liquid chromatography system is very different from that of preparative liquid chromatography in terms of stationary phase and operating conditions, such that this transposition is relatively complex. Computation tools have thus been designed to facilitate this transposition.

Thus, the document U.S. Pat. No. 7,686,959 describes a method implemented by computer using thin layer chromatography (TLC) data to compute preparative chromatography operating conditions. More specifically, this document teaches the computation, from thin layer chromatography, of the front ratio $R_{f1}$, $R_{f2}$ for two compounds of the sample to be purified, the computation of column volumes $CV_1$, $CV_2$ for each of said compounds from their respective front ratios (each column volume being equal to the inverse of the respective front ratio), and the computation of a column factor $\Delta CV$ defined as being the difference between the volumes $CV_2$ and $CV_1$. Yet, this factor $\Delta CV$ is specific to each column, which requires a large number of computations to determine the optimal column. Furthermore, this method requires a large number of interventions of the user (data inputs), which assumes that the user has sound knowledge of chromatography.

Yet, in so far as an operator charged with carrying out a preparative liquid chromatography purification is not necessarily a specialist in chromatography, it would be useful to offer a control method and system that is more automated and which only requires a minimum of interventions by the operator.

DESCRIPTION OF THE INVENTION

An aim of the invention is thus to design a method for controlling preparative liquid chromatography which may be implemented by a user who is a novice in chromatography, while minimising the amount of data to enter manually in order to determine the separating tool and purification conditions that are optimal and sufficient as a function of the expected result.

To this end, the invention proposes a method for controlling preparative liquid chromatography, comprising the following steps, at least a part of said steps being implemented by a computer comprising a processor and a display screen coupled to said processor:

(a) selecting an analytical liquid chromatography method from among thin layer chromatography (TLC) and high performance liquid chromatography (HPLC), (b) inputting analytical liquid chromatography data obtained by the method selected at step (a) for a product to be purified, (c) accessing a table of separating tools available to the user to implement said preparative liquid chromatography, (d) from said analytical liquid chromatography data and table of available separating tools, selecting an optimal separating tool from said table and computing preparative liquid chromatography operating conditions for said selected separating tool. This step notably includes the determination of a suitable gradient profile.

"Separating tool" is taken to mean a column, a cartridge or any other chromatography device comprising a stationary phase.

The method further comprises a step of reception of the amount of product to be purified.

According to an embodiment, the method further comprises a step of selecting the mode of introduction of the product to be purified into the selected separating tool, said introduction mode being selected from introduction in solution or solid deposition.

In an advantageous manner, the method also comprises a step of validation of the computation by a user and, after said validation, a step of launching preparative liquid chromatography on the selected separating tool.

According to an embodiment, the method comprises the triggering by a user of an acceleration of the preparative liquid chromatography. Step (d) then comprises the computation of the optimised operating conditions while taking account of the maximum flow rate and the limit pressure of the preparative liquid chromatography system in which the selected separating tool is implemented.

According to an embodiment, the method selected at step (a) is thin layer chromatography (TLC). Step (b) then comprises the input of analytical data obtained on a thin layer chromatography plate.

Preferably, the selection and the computation implemented at step (d) take into account four different cases according to the retention factor Rf values of the plate:

0.01<Rf<0.07,
0.08<Rf<0.4,
0.4<Rf<0.9, and
0.9<Rf<1.0

In a particularly advantageous manner, the method comprises an adaptation of the shape of the elution gradient to each value by a volume difference factor $\Delta CV$ while taking account of the fact that a same factor $\Delta CV$ corresponds to differences in retention factor $\Delta Rf$ different in each of said four zones.

Preferably, the selection and the computation implemented at step (d) take into account from one to all of the compounds of interest spread out over the whole of the plate.

In an advantageous manner, step (d) takes into account the difference between the eluant forces of the solvents used in preparative liquid chromatography and the non-linear variation of the eluant force of a mixture of solvents as a function of the composition of said mixture.

According to an embodiment, the method comprises the acquisition of an image of a thin layer chromatography plate and the automatic detection, from said image, of the compounds separated by a portable apparatus of the user, the input of the analytical data of step (b) comprising an importation of data from said portable apparatus.

According to an embodiment, the method selected at step (a) is high performance liquid chromatography, the selection further comprising the choice of a chromatography mode from among:
  normal phase liquid chromatography (NPLC),
  reverse phase liquid chromatography (RPLC),
  hydrophilic interaction chromatography (HILIC),
  hydrophobic interaction chromatography (HIC).

The analytical chromatography data entered at step (b) are then analytical liquid chromatography data obtained on a reference separating tool.

According to an embodiment, the table of available separating tools comprises a separating tool identical to the reference separating tool, and step (d) comprises the selection of said tool and the computation of the preparative liquid chromatography operating conditions for said separating tool.

In an alternative manner, the table of available separating tools does not comprise a separating tool identical to the reference separating tool, and step (c) comprises the selection of a separating tool having a stationary phase different from that of the reference tool by comparison of similarities between the stationary phase of the reference tool with the stationary phase of the available separating tools, or the selection of a separating tool comprising the same stationary phase as the reference tool and the computation of the preparative liquid chromatography operating conditions in multi-injection (or multi-run) mode while minimising the number of injections.

According to an embodiment, the method comprises a step of computation of separation by thin layer chromatography or by high performance liquid chromatography at iso-elution to determine other analytical conditions.

In an advantageous manner, the selection and the computation of step (d) take into account the eluant force specific to each strong solvent.

According to an embodiment, the method comprises the implementation of a screening separation test on a plurality of separating tools and the selection of the separating tool having the best separation potential from among said tools. This test is implemented when no analytical data exists liable to be entered at step (b), whether in thin layer chromatography or in high performance liquid chromatography.

According to an embodiment, the table of available separating tools comprises a separating tool identical to the tool having the best separation potential, and step (d) comprises the selection of said tool and the computation of the preparative liquid chromatography operating conditions for said separating tool.

In an alternative manner, the table of available separating tools does not include a separating tool identical to the tool having the best separation potential, and step (d) comprises the selection of a separating tool comprising the same stationary phase as the tool having the best separation potential and the computation of the preparative liquid chromatography operating conditions in multi-injection mode while minimising the number of injections.

According to an embodiment of the invention, the method comprises a sequencing of at least two series of steps (a) to (d), with two different analytical liquid chromatography methods and/or modes.

In a particularly advantageous manner, said sequencing is carried out automatically when a first series of steps (a) to (d) has not made it possible to identify a preparative liquid chromatography solution.

Another object of the invention is a system for the implementation of the method that has been described.

Said system comprises:
  a computer comprising a processor, a user interface and a display screen, the processor being configured to implement the steps of the method such as described above,
  a preparative liquid chromatography system controlled by said computer, comprising a mobile phase tank, a pump, an injector, a separating tool, a detector, a data recorder and a fraction collector.

Preferably, the control method described above will be implemented by means of a processing device comprising means for the implementation of the steps of the control method, such as a PC type computer comprising a memory and a processing unit on which is executed a computer programme.

This computer programme notably comprises one or more algorithms making it possible to execute the steps of the method described previously.

DESCRIPTION OF THE FIGURES

Other characteristics and advantages of the invention will become clear from the detailed description that follows, with reference to the appended drawings in which.

DETAILED DESCRIPTION OF EMBODIMENTS OF THE INVENTION

Figure 1:
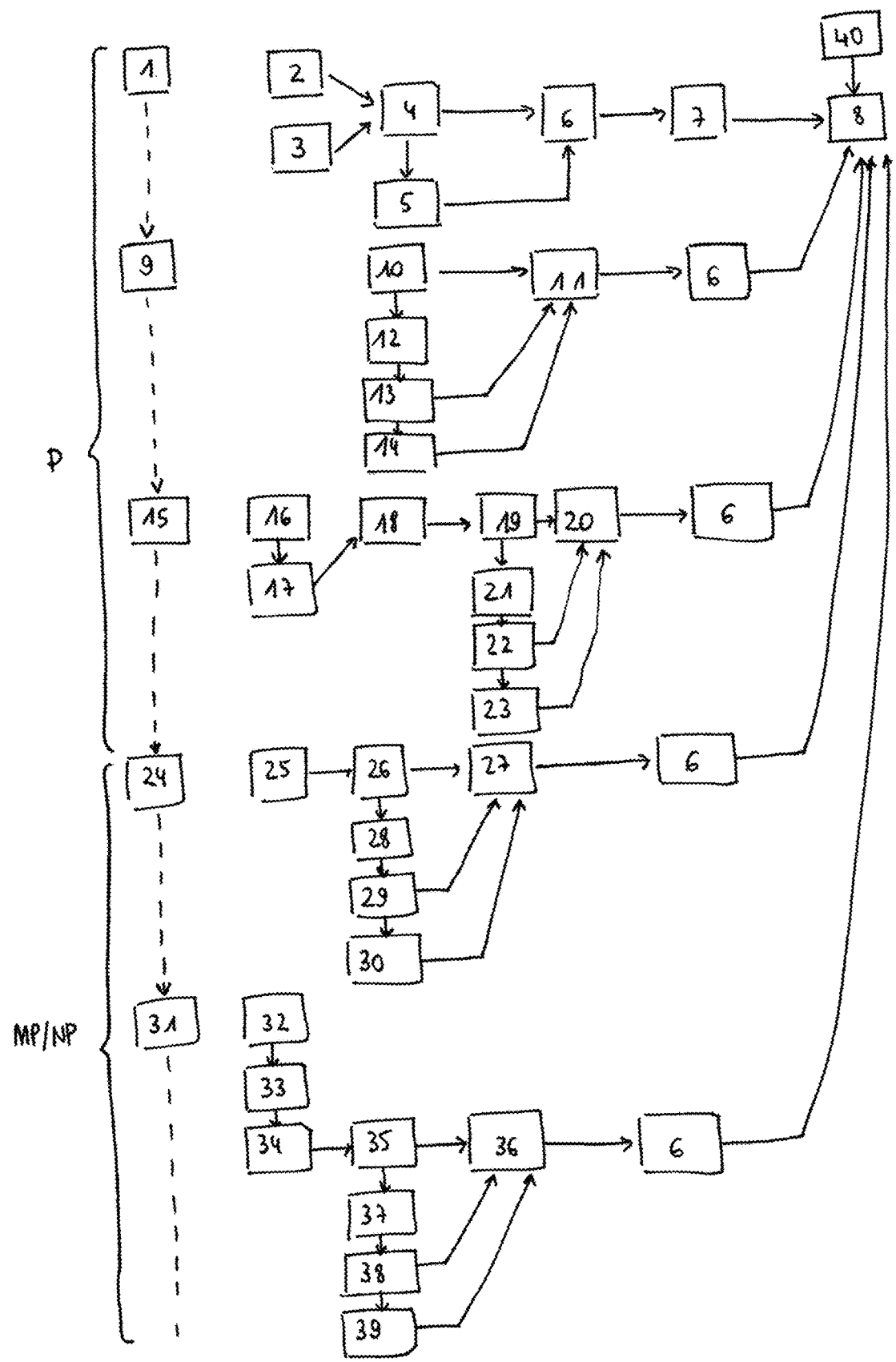
FIG. 1 is a logic diagram showing the operation of the system according to the invention.

The invention makes it possible, from an analytical chromatographic analysis, notably on thin layer or HPLC (high performance liquid chromatography or high pressure liquid chromatography) column, in normal phase, reverse phase or other, to propose the best possible purification compromise by preparative liquid chromatography.

Said preparative liquid chromatography may be implemented from low pressure to high pressure, and comprises in particular the designations flash chromatography, MPLC (medium pressure liquid chromatography) and HPLC. The implementation pressure is only limited by the chromatography system used, and notably the pressure that the separating tool can withstand. "Low pressure" is generally taken to mean a pressure of the order of several bars to several tens of bars; "high pressure" is generally taken to mean a pressure of several tens of bars to several hundreds of bars, or even more.

To this end, the invention proposes a method implemented by computer which guides the user from the provision of analytical data up to the definition of all the conditions that make it possible to implement preparative liquid chromatography. All of the steps may be implemented automatically, without the user being prompted to enter data or make choices.

This method is thus particularly interesting for a user who is a novice in chromatography.

However, even when the user has a certain level of expertise in chromatography, the method remains advantageous in so far as it makes it possible to reduce the time necessary for the determination of the operating conditions; furthermore, the method may comprise steps implemented directly by the user, which enable said user to interact with the algorithms used (expert mode).

The method includes accessing a table of separating tools available to the user. This table may be in the form of a database listing all of the tools in the user's stock, and comprising fields corresponding to the main characteristics of said tools: type of tool (for example: column, cartridge), constituent material of the tool (plastic, stainless steel, etc.), dimensions (inner diameter, width, etc.), nature of the stationary phase, particle size of the stationary phase, make or supplier of the stationary phase, etc. In the remainder of the text, the term "column" will be employed for reasons of brevity, but without any limitation with regard to the type of separating tool employed. In a particularly advantageous manner, said preparation tools make it possible to implement different chromatography techniques, notably techniques being able to be implemented at different pressures (from low pressure to high pressure), in normal phase and/or in reverse phase.

The method may advantageously be implemented in the chromatography systems sold by the Applicant under the tradename puriFlash™, but could also be implemented in other systems. These systems comprise in a general manner a mobile phase tank, a pump, an injector, a separating tool, a detector, a data recorder and a fraction collector. Such systems are well known to those skilled in the art and will thus not be described in greater detail in the present text.

The method may comprise access to a table of chromatography systems (or apparatuses) available to the user. The method takes into account the needs expressed by the user according to the stage of development of the product, for example in terms of purity to reach, in order to propose the most suitable chromatography system. The definition of the system takes account of the dwell volumes of the apparatus and the necessary pumping power. Thus, the method makes it possible to choose the most suitable chromatography tool and system as a function of the product to be purified and the desired degree of purity.

The control unit comprises a processor configured to implement a certain number of algorithms described below, or to communicate with a remote computer implementing said algorithms. Optionally, in the case of a solid sample, the system may also comprise a solid injection support (generally called dry load); this support is arranged on the mobile phase circuit upstream of the column.

The logic diagram of FIG. 1 illustrates the general architecture of the method.

The different modalities are described hereafter successively.

It is interesting to note that all of the modalities are sequenced, such that they may optionally all be implemented from TLC analytical data which are the data the most conventionally available in the user's stock, while going to other types of analytical data when TLC analytical data are not available or are not satisfactory. Thus, when a type of analytical data does not make it possible to propose to the user a preparative liquid chromatography solution, said user is automatically guided to another type of analytical data capable of making it possible to end up with the proposal for a separative liquid chromatography solution. Consequently, even if he is a novice in chromatography, the user is entirely guided from the provision of analytical data up to a preparative liquid chromatography solution being obtained.

Naturally, as a function of the nature of the sample (polar or not) and the nature of the analytical data available, only some of these steps could be implemented, the user being free to launch the implementation of the method from any of said modalities. However, the system is configured to be able to process all the types of analytical data detailed below.

In a first step, the user is prompted to select, by means of an interface, the analytical liquid chromatography method implemented to obtain the analytical data to use. This selection is made from among the following methods, which are proposed to the user by the interface:
  thin layer chromatography (TLC),
  high performance liquid chromatography (HPLC).

If appropriate, the selection also comprises the chromatography mode employed to obtain the data on HPLC column. The chromatography mode is typically selected from:
  normal phase liquid chromatography (NPLC),
  reverse phase liquid chromatography (RPLC),
  hydrophilic interaction chromatography (HILIC): this technique is particularly advantageous for the separation of small polar molecules,
  hydrophobic interaction chromatography (HIC): this technique is particularly advantageous for the separation of hydrophobic amino acids, peptides and proteins.

In a second step, the analytical data obtained by the method selected previously are supplied to the processor as input data, through an interface. As will be described in detail below, these data may be input manually by the user in a table, or be imported from a portable apparatus such as a smartphone or a tablet in which the data are stored.

A first series (P) of situations concerns a polar sample.

According to a first possibility (box 1), the user has analytical data on a TLC plate available, for the sample considered.

The processing of TLC analytical data has been the object of an original development by the inventors.

First, the definitions of the quantities used are recalled:
  the retention factor Rf is a relative quantity which characterises the elution of a compound on a thin layer chromatography (TLC) plate. It is the ratio between the migration distance of a solute over the migration distance of the mobile phase. Thus, a totally eluted solute has a retention factor equal to 1. A solute that is not carried along by the mobile phase has a retention factor equal to 0.
  k is a thermodynamic quantity characterising the retention of a solute in a column, which is equal to $(t_r-t_0)/t_0$ or $(V_r-V_0)/V_0$,
  where $t_r$ is the retention time of the solute, $t_0$ the time that it takes the mobile phase to pass through the column, $V_r$ the volume of mobile phase required to take solute from the column, V0 the pore volume of the column.

For a same chromatographic system, a fundamental relationship exists linking the retention factors Rf and k:

$$k=(1-Rf)/Rf$$

Δk is a relative quantity independent of the geometry of the column, which is characteristic of a given solute, eluted on a given stationary phase by a given mobile phase at a given temperature.

in preparative liquid chromatography, it is the volume of mobile phase required to collect the solute which is the really useful quantity. This volume Vs, sometimes called CV, is expressed in units of dwell volume of the column to take account of different column geometries:

$$Vs=CV=Vr/V0=1+k$$

Figure 2:
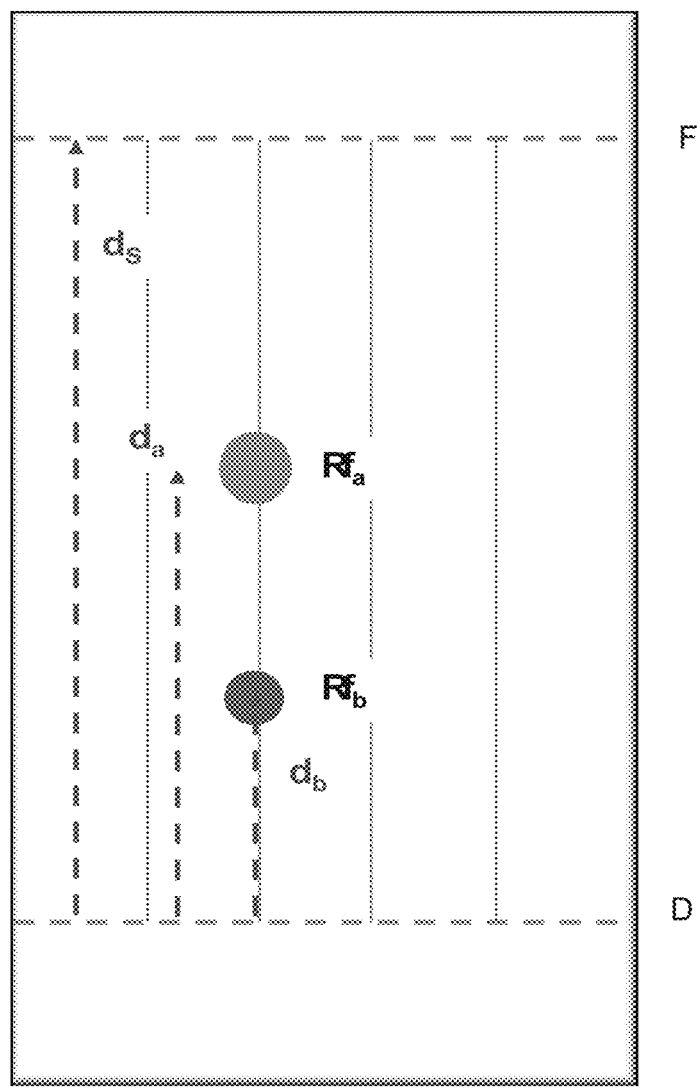
FIG. 2 is a diagram of a separation obtained on a thin layer chromatography plate.

FIG. 2 illustrates in a schematic manner a TLC plate with two stains each corresponding to a compound a, b, of which one is the compound of interest and the other its closest neighbour. $d_s$ is the distance between the deposition line (designated by the letter D) of the sample and the solvent front (designated by the letter F). $d_a$ is the distance between the sample deposition line and the centre of the stain corresponding to compound a, and $d_b$ is the distance between the sample deposition line and the centre of the stain corresponding to compound b.

$$Rf_a=d_a/d_s$$

$$Rf_b=d_b/d_s$$

$$Vs_a=CV_a=1/Rf_a=1+k_a$$

$$VS_b=CV_b=1/Rf_b=1+k_b$$

hence: $\Delta CV=CV_b-CV_a$ $$k=K_{tr}\times(1/Rf-1) \text{ with } K_{tr}=\text{constant}=1$$

$$\Delta k=K_{tr}\times[(1/Rf_b-1)-(1/Rf_a-1)]$$

hence: $\Delta CV=\Delta k$

The invention may be implemented with a TLC plate of which the retention factor Rf of the compound of interest is comprised between 0.01 and 1.0 with a difference Δk in retention between the compound of interest and its closest neighbour (or its two closest neighbours) greater than or equal to 0.20 and for ΔRf≥0.02.

It may take into account from one to all of the compounds present on the TLC plate, said compounds being able to be spread out over the whole of the TLC plate. Thus, a transposition of thin layer chromatography to preparative liquid chromatography may always be implemented, which makes it possible to propose to the user a purification solution without requiring the user to carry out additional manipulations.

The originality of the treatment is that it takes account of the amplitude Δε° (that is to say the difference between the eluant forces of two solvents taken separately) and the non-linear variation of the eluant force of a mixture of pure solvents as a function of the composition of the mixture, ε° being the eluant force of a solvent.

The computations define five working amplitudes representative of all of the amplitudes covering the eluant forces of the solvents entered in the software.

In addition, the inventors have defined, as a function of the absolute and relative position of the compounds on the TLC plate, four retention zones of the compound of interest.

For example, for the pairing cyclohexane/ethyl acetate, for which Δε°=0.38, the following zones have been defined:

(0.01<Rf≤0.07)–(0.08≤Rf≤0.40)–(0.40<Rf≤0.9)–(0.9<Rf<1.0)

and, for each of these zones, the following six strong solvents conditions have been defined to mimic by bits the curvature of the eluant force (the strong solvent being the most eluant solvent of the mobile phase):

(0<% strong S≤4)–(5≤% strong S≤8)–(9≤% strong S≤13)–(14≤% strong S≤20)–(21≤% strong S≤53)–(54≤% strong S<100), where % strong S is the percentage by volume of strong solvent in the mobile phase.

For each of these retention zones, the computation of the Δk of the critical pair or triplet (that is to say the pair or triplet of peaks which are the least well resolved) making it possible, knowing the pore volume V0 of the columns, to propose a certain number of gradient conditions and isocratic conditions and as a function of the size of the particles of the column (box 4).

This leads to 1215 cases in total (for 115 of these cases, separation is not possible).

The shape of the elution gradient is thus suited to each value of ΔCV while taking account of the fact that a same factor ΔCV corresponds to differences in retention factor ΔRf different in each of the aforementioned four retention zones.

From these elements, a computer algorithm has been constructed to sequence all of the conditions relative to the four zones and to lead to a unique preparative liquid chromatography solution. This algorithm integrates a computation of a direct scale-up factor based on the dimensioning of the column to use as a function of the amount of sample to be purified. Said factor is the scale-up factor between the amount of material in analytical chromatography and that in preparative liquid chromatography.

The user indicates, as supplementary input datum, the mass of sample to be purified.

The user can also select the mode of introduction of the product to be purified, from among introduction in solution or solid deposition (dry load).

An algorithm computes the best relevancy between the geometry and the nature of the chromatography column, based on the load equations to improve the cost/productivity ratio of the preparative liquid chromatography.

The initial conditions and the shape of the gradients are calculated from the Rf and the ΔRf of the solutes in TLC. The different gradient profiles proposed are based on the shape of the curves of eluant forces of binary mixtures of solvents in HPLC with normal phase polarity (normal phase mode).

A classification of six columns is ordered as a function of the difficulty of separation Δk and ΔRf (box 6). This classification is carried out from the table of columns, such that the proposal contains at least three columns in the user's stock. This classification takes into account the type of column, the type of stationary phase and the molecular weight of the compounds of interest.

The display of the columns proposed from among all the columns available is thus modulated as a function of the targeted application and the input data.

The user is advantageously invited to validate the chosen column (box 7).

Different means for entering analytical data exist.

According to an embodiment, the user manually inputs the analytical data in a table to complete (box 2). The data input typically comprise:

for TLC: the Rf, the compounds of interest, the solvents and the mass to be purified;

for HPLC: the retention time of the compounds, the sum of the dwell volumes upstream of the column, the inner diameter of the column and its length, the particle size of the stationary phase, the dwell volume of the analytical column, the flow rate and the volume injected.

According to a particularly advantageous embodiment, the user has at his disposal a smart portable device, such as a smartphone or a tablet, equipped with an application dedicated to the acquisition of TLC analytical data and the transfer of said data to the processor intended for the elaboration of a preparative liquid chromatography solution (box 3). Such an application has the advantages of making more rapid and simple the thin layer chromatography step and its processing.

Said application has the following functionalities:

(1) the automatic detection of the compounds on the TLC plate:

From a photograph of a TLC plate taken directly by the user or downloaded from a library of photographs situated in the user's smartphone, the algorithm distinguishes (if the contrast so allows) the contour of the shapes and places a point at their centre indicating the presence of a compound. If the compound is not recognised automatically by the algorithm, the user can manually identify the compounds or make corrections. He must also place two lines representing the deposition line of the sample and the solvent front.

(2) the identification of the compounds of interest and the computation of the retention factors (Rf) and the $\Delta CV$ (=$\Delta k$)

Once all the compounds have been identified, the user indicates those of interest by clicking on them. The retention factors Rf are displayed for each compound of interest. If he so wishes, by pressing on a dedicated button, the user can see if his compounds are in the comfort working zone. The zone is typically comprised from 0.1 to 0.4.

The user can also, by clicking on a button dedicated to this purpose, display the $\Delta CV$ (=$\Delta k$). These are calculated from the placement of the upper and lower compounds.

The application communicates the smallest $\Delta CV$ (=$\Delta k$) in the form "Min $\Delta CV$". From this datum, an alert message is displayed indicating to the user the level of difficulty of the separation. For example, the manual mode may comprise three levels of difficulty:

easy, corresponding to a "min $\Delta CV$" greater than 4, standard, corresponding to a "min $\Delta CV$" comprised between 1.5 and 4, difficult, corresponding to a "min $\Delta CV$" less than 1.5.

(3) entering the solvents and the amount of sample to be purified:

The user is invited to enter the amount of sample to be purified and to select the solvents (two at the most) that have been used and their respective proportion in %. For each of the solvents, the user can indicate if there is an additive and add a comment about them or in a more general manner on the following screen if he so wishes.

A screen summarising his data is then displayed.

(4) the direct and secure transmission of this information to the chromatography system:

The aforementioned data may be saved in the personal database of the user, sent to the user by e-mail, or its information sent by Bluetooth or Wi-Fi to the preparative liquid chromatography system.

(5) pairing the application with the preparative liquid chromatography system:

The application comprises a parameterising module making it possible to pair the chromatography system with the application via Wi-Fi, by means of a file transfer protocol (FTP) where the dossier of analytical data will be filed and read. This parameterising module may also enable the user to enter his email address to receive files.

(6) the archiving and the repeated sending of same data:

The application advantageously comprises an archiving module in which the user can, if he so desires, archive his data. In this case, the data will only be consultable from his smartphone. If needs be, the user can send again and as many times as he wishes the analytical data of a TLC plate to the chromatography system.

In an advantageous manner, the sending is done via a .json file comprising a photograph of the plate, the name that has been attributed thereto, the Rf of the compounds of interest, the comments on the plate in general, the indication of the amount of product to be purified, the name of the solvents, their proportion in %, the mention of an additive and potential comments on the solvents if applicable. All of these data are read by the processing algorithm described below in order to elaborate proposals for preparative liquid chromatography solutions.

It may however happen that the TLC separation is not satisfactory, for example due to the positioning of the peak(s) of interest, due to the nature or the amount of solvent to carry out the purification is greater than the user's stock, due to the fact that no suitable column is in stock, etc.

In this case the processor launches an algorithm which, by changing the analytical conditions, notably the strong solvent or the pair of solvents used, makes it possible to obtain, at iso-elution, separations that are different from the initial separations (box 5). This makes it possible to determine the experimental conditions having the best potential in the optimum retention zone to obtain efficient purification. The algorithm is based for this purpose on the universal diagram described in the work Principles of Adsorption Chromatography, R. L. Snyder, ed. M. Dekker (1968).

The algorithm computes the limits of percentages of strong solvent specific for each of the aforementioned five working amplitudes.

Then, preparative liquid chromatography conditions are proposed (box 6 described previously).

In the absence of analytical TLC data, but if an analytical chromatogram is available (box 9), another module is used, as described hereafter.

In the case of a chromatogram obtained by HPLC, the resolution between two peaks is defined by the relationship:

$$Rs = 2 \times (t_{R2} - t_{R1})/(\omega_2 - \omega_1),$$

where $t_R$ is the retention time of a peak, and $\omega$ is the width of a peak at its base.

It follows that the greater is Rs the better the separation between two peaks.

In a first case (box 10), the analytical stationary phase is identical to that of at least one column of the table of columns. From the entered analytical column, an algorithm identifies one or more columns in the table of columns of which fields relative to the material of the stationary phase, its tradename and its grafting are in keeping. The amount of sample to be purified is entered.

Another algorithm (box 11) selects column(s) compatible with the system in terms of pressure, while taking account of the nature of the stationary phase, the size of the particles, the nature of the solvents and the material of the column.

An algorithm calculates the scale-up ratio from the inner diameter and the length of the columns and the percentage porous volume of the stationary phase particles used.

The mass of raw sample to be purified is divided by said scale-up ratio to calculate the number of injections to make.

Finally, an algorithm performs the transposition of the gradient method from an analytical column to a gradient method for a preparative liquid chromatography column. This transposition is based on the direct ratio of the dimensions of the columns, the re-computation of the slope of the gradient, its steps and its times and the percentage porous volume of the particles used. It also takes account of the dwell volume V0 of the columns and the delay volume of the apparatus. It thus predicts the evolution of the pressure and the consumption of solvent. The analytical retention times of the compounds entered into a table for computing retention times are similarly transposed into predictive retention times on the preparative liquid chromatography column.

In the case where the user does not have a column having the same stationary phase as that of the analytical evaluation (box 12), an algorithm identifies in the table of columns if the field relative to the nature of the stationary phase corresponds to (a) an untreated silica, (b) a grafted silica other than C18 or (c) a C18 grafted silica.

In cases (a) and (b) (silica or grafted silica other than C18), the algorithm identifies if the fields relative to the stationary phase and the type of grafting in the table of the columns can be correlated; in the affirmative, the algorithm proposes a direct transfer.

In case (c) (C18 grafted silica, which may have major differences in selectivity depending on the grafting carried out), a table, designated "Atom table", compiling the experimental data of several hundreds of columns based on C18 grafted silica, of different makes and manufacturers, has been constructed beforehand. The algorithm performs a normalisation of the experimental values as a function of the extremes. For each analytical column and for each of the qualification criteria, a Euclidian distance relative to all of the other columns is calculated. After normalisation each distance of each criterion is added together to become the reference value of this column vis-à-vis all the others. One of the criteria consisted in defining a unified parameter relative to hydrophobicity.

The algorithm searches in said Atom table the fields stationary phase, make and type of grafting identical to those of the analytical column entered (box 13).

If it recognises it, the algorithm calculates the proximities (Euclidian distances) of the selectivities of all of the stationary phases which are in the Atom table. It classifies the responses by increasing order and only retains candidates of which the proximity values are less than 0.17.

The algorithm compares its results with the Atom table and it uniquely retains six candidates depending on the criteria based on the number of injections and their presence in the table of columns, which translates the fact that they are in the user's physical stock.

The following steps are those described for box 11.

In the case where the user does not have any suitable column (box 14), he is notified of the fact that he has to purchase a suitable column. As a function of the column purchased, the following steps are those described for box 11.

If no solution in direct normal phase is found (box 15), a screening in normal phase is implemented (box 16). Such a screening consists in studying the separation on different selectivities in normal phase in analytical column from a HPLC column or flash chromatography column.

At the end of this screening, an algorithm selects the column having the best purification potential (box 17). An algorithm may optionally propose elution conditions making it possible to obtain different separations.

The algorithm then resorts to an analytical chromatogram of the separation with the selected column (box 18).

In a first case (box 19), the analytical stationary phase is identical to that of at least one column of the table of columns. From the analytical column entered, an algorithm identifies one or more columns in the table of columns of which fields relative to the material of the stationary phase, its make and its grafting are in keeping. The amount of sample to be purified is entered.

Another algorithm (box 20) selects the column(s) compatible with the system in terms of pressure, taking account of the nature of the stationary phase, the size of the particles, the nature of the solvents and the material of the column.

An algorithm calculates the scale-up ratio from the inner diameter and the length of the columns and the percentage porous volume of the stationary phase particles used.

The mass of raw sample to be purified is divided by said scale-up ratio to calculate the number of injections to carry out.

Finally, an algorithm carries out the transposition of the gradient method from an analytical column to a gradient method for a preparative liquid chromatography column. This transposition is based on the direct ratio of the dimensions of the columns, the re-computation of the slope of the gradient, its steps and its times and the percentage porous volume of the particles used. It also takes account of the dwell volume V0 of the columns. It thus predicts the evolution of the pressure and the consumption of solvent. The analytical retention times of the compounds entered into a table for computing the retention times are in the same way transposed into predictive retention times on the preparative liquid chromatography column.

In the case where the user does not have a column having the same stationary phase as that of the analytical evaluation (box 21), an algorithm identifies in the table of columns if the field relative to the nature of the stationary phase corresponds to (a) an untreated silica, (b) a grafted silica other than C18 or (c) a C18 grafted silica (box 22).

In cases (a) and (b) (silica or grafted silica other than C18), the algorithm identifies if the fields relative to the stationary phase and to the type of grafting in the table of columns can be correlated; in the affirmative, the algorithm proposes a direct transfer (box 20).

In case (c) (C18 grafted silica, which may have major differences of functionalities depending on the grafting carried out), a table, named "Atom table", compiling the experimental data of several hundreds of C18 grafted silica based columns, of different makes and manufacturers, has been constructed beforehand. The algorithm performs a normalisation of the experimental values as a function of the extremes. For each analytical column and for each of the qualification criteria a Euclidian distance relative to all of the other columns is calculated. After normalisation each distance of each criterion is added together to become the reference value of this column vis-à-vis all the others. One of the criteria consisted in defining a unified parameter relative to hydrophobicity.

The algorithm searches in said Atom table the fields stationary phase, make and type of grafting identical to those of the analytical column entered (box 13).

If it recognises it, the algorithm calculates the proximities (Euclidian distances) of the selectivities of all of the stationary phases which are in the Atom table. It classifies the responses by increasing order and only retains candidates for which the proximity values are less than 0.17.

The algorithm compares its results with the Atom table and it uniquely retains six candidates depending on criteria based on the number of injections and their presence in the table of columns, of which at least three columns are in the user's physical stock.

The following steps are those described for box 20.

In the case where the user does not have any suitable column (box 23), he is notified of the fact that he must purchase a suitable column. As a function of the purchased column, the following steps are those described for box 20.

If no solution is found following screening in normal phase, but that a solution in reverse phase exists (box 24), a second series of situations is entered into which concerns a non-polar or moderately polar (NP/MP) sample.

According to a first possibility, an analytical chromatogram of the separation is available (box 25).

The implementation of the method according to boxes 26-30 is similar to that described above with reference to boxes 10-14 and is thus not described again.

In the case where no solution in reverse phase is available (box 31), the system proposes the implementation of a study of the separation on different selectivities in reverse phase, from an HPLC or flash chromatography system (box 32).

An algorithm makes it possible in two steps and from a set of columns of which the thermodynamic parameters p and q are known to determine the column having the most interesting separation potential (box 33). The first step determines the mobile phase conditions for which the retention factor of the last of the compounds eluted from the mixture to be purified is of the order of 10 and makes it possible to recalculate the iso-elution conditions so that each of the other columns attains this same objective. The second step is that of the injection of the sample into each of the columns at iso-elution, then by comparison of the chromatographic profiles, the most relevant column is chosen.

According to a first possibility, an analytical chromatogram of the separation is available (box 34).

The implementation of the method according to boxes 35-39 is similar to that described above with reference to boxes 10-14 and 26-30 and is thus not described again.

In all cases, once the chosen column has been put in place in the chromatography system, the processor launches the implementation of the chromatography according to the computed operating mode (box 8).

In a particularly advantageous manner, the preparative liquid chromatography method may be accelerated by means of the algorithm described hereafter.

This possibility of acceleration allows the user to satisfy, on the one hand, the need to terminate more rapidly a purification in order to be able to take care of another task that has become a priority and/or, on the other hand, to reduce the analysis time while estimating that the resolution of the critical pair will not be impacted in a significant manner by the increase in the flow rate.

To this end, an algorithm evaluates the maximum acceptable flow rate for the purification underway and the pressure factor (taken into account with notably the limit pressure of the chromatography system concerned, that of the column and potentially that of the dry-load) as a function of the difficulty of separation $\Delta k$ for TLC analytical data and Rs for HPLC analytical data (box 40). An algorithm automatically adjusts the gradient method to the new condition in real time. The user can choose to trigger the acceleration at any moment of the purification. This operation is reversible and carried out in complete security, without any loss of product.

REFERENCES

U.S. Pat. No. 7,686,959

The invention claimed is:

1. A method for controlling preparative liquid chromatography, comprising the following steps, at least a part of said steps being implemented by a computer comprising a processor and a display screen coupled to said processor:
   (a) selecting an analytical liquid chromatography method from among thin layer chromatography (TLC) and high performance liquid chromatography (HPLC) by means of a computer interface,
   (b) inputting analytical liquid chromatography data obtained by the method selected at step (a) for a product to be purified,
   (c) accessing a table of separating tools available to the user to implement said preparative liquid chromatography,
   (d) from said analytical liquid chromatography data and table of available separating tools, selecting an optimal separating tool from said table and computing preparative liquid chromatography operating conditions for said selected separating tool.

2. The method of claim 1, further comprising a step of entering an amount of product to be purified.

3. The method of claim 1, further comprising a step of selecting a mode of introduction of the product to be purified into the selected separating tool, said mode of introduction being selected from introduction in solution or solid deposition.

4. The method of claim 1, further comprising a step of validating the computation by a user and, after said validation, a step of launching the preparative liquid chromatography on the selected separating tool.

5. The method of claim 1, further comprising triggering by a user an acceleration of the preparative liquid chromatography, step (d) comprising the computation of optimized operating conditions while taking account of a maximum flow rate and a limit pressure of the preparative liquid chromatography system in which the selected separating tool is implemented.

6. The method of claim 1, wherein the method selected at step (a) is thin layer chromatography (TLC) and step (b) comprises inputting analytical data obtained on a thin layer chromatography plate.

7. The method of claim 6, wherein the selection and the computation implemented at step (d) take into account four different cases according to the retention factor (Rf) values of the plate:
   $0.01<Rf<0.07$,
   $0.08<Rf<0.4$,
   $0.4<Rf<0.9$,
   $0.9<Rf<1.0$.

8. The method of claim 7, further comprising adapting a shape of the elution gradient to each value by a volume difference factor (CV) while taking account of the fact that a same factor (DCV) corresponds to differences in retention factor (Rf) different in each of said four zones.

9. The method of claim 6, wherein the selection and the computation implemented at step (d) take into account from one to all of the compounds of interest spread out over the whole of the plate.

10. The method of claim 6, wherein step (d) takes into account a difference ($\Delta\varepsilon°$) between eluant forces of the solvents used in the preparative liquid chromatography and a non-linear variation of the eluant force of a mixture of solvents as a function of the composition of said mixture.

11. The method of claim 6, comprising acquiring an image of a thin layer chromatography plate and an automatic detection, from said image, of the compounds separated by a portable apparatus of the user, the input of analytical data of step (b) comprising an importation of data from said portable apparatus.

12. The method of claim 1, wherein the method selected at step (a) is high performance liquid chromatography, the selection further comprising the choice of a chromatography mode from among:
normal phase liquid chromatography (NPLC),
reverse phase liquid chromatography (RPLC),
hydrophilic interaction chromatography (HILIC),
hydrophobic interaction chromatography (HIC).

13. The method of claim 12, wherein the analytical chromatography data entered at step (b) are analytical liquid chromatography data obtained on a reference separating tool.

14. The method of claim 13, wherein the table of available separating tools comprises a separating tool identical to the reference separating tool, and step (c) comprises selecting said tool and computing the preparative liquid chromatography operating conditions for said separating tool.

15. The method of claim 13, wherein the table of available separating tools does not include a separating tool identical to the reference separating tool, and step (d) comprises the selection of a separating tool having a stationary phase different from that of the reference tool by comparison of similarities between the stationary phase of the reference tool with the stationary phase of the available separating tools, or the selection of a separating tool comprising the same stationary phase as the reference tool and the computation of the preparative liquid chromatography operating conditions in multi-injection mode while minimizing the number of injections.

16. The method of claim 6, comprising a step of computing separation by thin layer chromatography or by high performance liquid chromatography at iso-elution to determine other analytical conditions.

17. The method of claim 6, wherein the selection and the computation of step (d) take into account the eluant force specific to each strong solvent.

18. The method of claim 1, further comprising implementing a separation test on a plurality of separating tools and selecting the separating tool having the best separation potential from among said tools.

19. The method of claim 18, wherein the table of available separating tools comprises a separating tool identical to the tool having the best separation potential, and step (d) comprises selecting said tool and computing the preparative liquid chromatography operating conditions for said separating tool.

20. The method of claim 18, wherein the table of available separating tools does not include a separating tool identical to the tool having the best separation potential, and step (d) comprises selecting a separating tool comprising the same stationary phase as the tool having the best separation potential and computing the preparative liquid chromatography operating conditions in multi-injection mode while minimizing the number of injections.

21. The method of claim 1, further comprising sequencing at least two series of steps (a) to (d), with two different analytical liquid chromatography methods and/or modes.

22. The method of claim 21, wherein said sequencing is carried out automatically when a first series of steps (a) to (d) has not made it possible to identify a preparative liquid chromatography solution.

23. A preparative liquid chromatography system, comprising:
a computer comprising a processor, a user interface and a display screen, the processor being configured to implement the steps of the method of claim 1,
a preparative liquid chromatography system controlled by said computer, comprising a mobile phase tank, a pump, an injector, a separating tool, a detector, a data recorder and a fraction collector.

24. A non-transitory computer readable medium encoded with a computer program comprising instructions for the implementation of the method of claim 1.

* * * * *